US009509178B2

(12) United States Patent
Richter et al.

(10) Patent No.: US 9,509,178 B2
(45) Date of Patent: Nov. 29, 2016

(54) SYSTEM AND A METHOD FOR COMMUNICATING USER INTERACTION DATA TO ONE OR MORE COMMUNICATION DEVICES

(71) Applicant: R2Z Innovations, Inc., Vancouver (CA)

(72) Inventors: Wolfgang Richter, Dortmund (DE); Faranak Zadeh, Vancouver (CA)

( * ) Notice: Subject to any disclaimer, the term of this patent is extended or adjusted under 35 U.S.C. 154(b) by 170 days.

(21) Appl. No.: 14/629,700

(22) Filed: Feb. 24, 2015

(65) Prior Publication Data
US 2016/0248481 A1    Aug. 25, 2016

(51) Int. Cl.
*H04B 5/00* (2006.01)
*H02J 17/00* (2006.01)
*H02J 3/00* (2006.01)

(52) U.S. Cl.
CPC . *H02J 17/00* (2013.01); *H02J 3/00* (2013.01)

(58) Field of Classification Search
CPC ............ H04W 4/008; G06K 7/10366; G06K 19/07788; G06K 19/0723; G06F 3/04842; G06Q 30/0261; G06Q 10/087; G06Q 30/0623; H04B 5/0062; H02J 3/00; H02J 17/00
See application file for complete search history.

(56) References Cited

U.S. PATENT DOCUMENTS

| | | | | |
|---|---|---|---|---|
| 6,476,708 | B1 * | 11/2002 | Johnson | G06K 7/0008 340/10.34 |
| 7,580,380 | B2 * | 8/2009 | Baker | H04W 84/18 370/310 |
| 2003/0017804 | A1 * | 1/2003 | Heinrich | G06K 19/0701 455/41.1 |
| 2006/0152209 | A1 * | 7/2006 | Sasaki | G01R 15/241 324/96 |
| 2011/0025462 | A1 * | 2/2011 | Stern | G06K 7/0008 340/10.1 |
| 2012/0238899 | A1 * | 9/2012 | Bacquet | G06K 7/0008 600/549 |
| 2016/0248481 | A1 * | 8/2016 | Richter | H04B 5/0062 |

* cited by examiner

*Primary Examiner* — An T Nguyen (57) ABSTRACT

A system attached to an object for communicating the object information to communication devices. The system includes an electronic circuitry to communicate an identification-information, and a hub section coupled to the communication device to power the electronic circuitry and further receives the identification-information transmitted from the electronic circuitry. The electronic circuitry may be embedded in a single chip/printed decal/flexible polymer foil. The hub section includes a generator, a first converter, a first switching unit, a first electrode, a first detection unit, and a hub controller. The electronic circuitry includes a second electrode, a floating electrode, a second converter, a buffer, a second detection unit, a modulation unit, and an analog processing unit. The hub controller authenticates the electronic circuitry on receiving the modulated identification-information; further the hub controller communicates the object information to the electronic circuitry and the communication devices based on the modulated identification-information.

14 Claims, 8 Drawing Sheets

SYSTEM AND A METHOD FOR COMMUNICATING USER INTERACTION DATA TO ONE OR MORE COMMUNICATION DEVICES

BACKGROUND OF THE INVENTION

1. Field of the Invention

The present invention generally relates to a system and a method for communicating user interaction data to one or more communication devices, and more particularly relates to a system and a method for communicating data of an object based on a user interaction to one or more communication devices.

2. Description of Related Art

Generally the internet of things (IOT) relies on smart sensors which are usually a combination of sensing element, processing unit, and a communication unit for example Bluetooth or Wi-Fi. All these components are mounted or soldered on a printed circuit board and equipped with batteries to operate system. Said batteries are consisting of mostly toxic elements in the electrodes which is harmful in combination with food or edible or children in reach. These batteries require highest efforts for recycling.

Various physical forces require different sensors for measuring. Broadly, microelectronic mechanical systems (MEMS) used to track the movements, accelerations or orientations. Said MEMS are connected to MCUs which consist of billions of transistors and or logic elements and process on a high speed which relates in power consumption. Such devices spent most of their time in "sleep modes" which makes them ineffective.

Further smart sensors available in the art used for monitoring the status of the product, storing the information related to the product, and then communicating the status and information of the product come in a wide variety, but all these sensors need to be powered with electric energy to do the aforementioned operation. Further a wired or wireless communication network is used for communicating the information.

If these smart sensors operate wirelessly, most of them are using radio frequencies in a higher range, up to several Giga-hertz. It is well known that microwaves warm up tissue and cells of the human dermis/body. The smart sensors work on batteries which need to be replaced or recharged from time to time depending on the power consumption of each sensor. Complicated server software is needed to guaranty collision-free functioning in a smart sensor network.

Therefore there is a need of a single dedicated chip, which may be realized either by siliconizing and/or as printed electronic on polymer foil, is self-powered by an alternating electric field within its reach. Further there is also a need of a system and a method for self-communicating the gathered information over the same field, collision free and self-organized within sensor networks. Additionally there is also need of a system that requires no batteries to operate and which require no additional external parts.

SUMMARY OF THE INVENTION

In accordance with the teachings of the present invention, a system attached to an object for communicating the object information to one or more communication devices, is provided. The system includes an electronic circuitry to communicate the identification-information, and a hub section coupled to the communication device to power the electronic circuitry and further receives the identification-information transmitted from the electronic circuitry.

The hub section includes a generator, a first converter, a first switching unit, a first electrode, a first detection unit, and a hub controller. The generator receives DC power from a DC source of the communication device for generating low level AC power. The first converter to shift the low level AC power received from the generator to high level AC power. The first electrode connected to the first converter for emitting alternating electric field of fixed frequency.

The first switching unit operative to transfer the AC power generated from the generator to the first electrode. The first detection unit detects a change in alternating electric-field across the first electrode. The hub controller operative to send a command data to the electronic circuitry based on the detected information for transmitting the first object information to the electronic circuitry.

The electronic circuitry includes a second electrode, a floating electrode, a second converter, a buffer, a second detection unit, a modulation unit, and an analog processing unit. The second electrode to receive the alternating electric field emitted from the first electrode. The floating electrode floats the alternating electric field to the ground for forming a closed capacitive electric circuit with either the object or the hub section. The second converter connected to the second electrode to convert the received alternating electric field into the DC energy.

The buffer configured to store the DC energy received from the second converter. The second detection unit operative to measure the variation in the alternating electric field over the second electrode or the floating electrode, and further releases identification-information for communicating with the hub controller based on the command data.

The modulation unit operative to modulate the identification-information received from the second detection unit. The modulation unit transmits a modulated identification-information received from the modulation unit to the hub controller. The hub controller authenticates the electronic circuitry on receiving the modulated identification-information, further the hub controller releases the first object information to the electronic circuitry and the communication devices.

The second detection unit includes a first Schmitt trigger, a selector, a counter, a second Schmitt trigger and an interpreter. The first Schmitt trigger configured to generate a pulse interval signal related to the variation in the alternating electric field across the second electrode. The second Schmitt trigger configured to generate a clock signal on receiving AC power from the second electrode. The counter configured to receive the pulse interval signal and the clock signal for generating a counter-value of the alternating electric field.

The interpreter interprets the counter-value into electric-field percentage value indicating the identification-information of the electronic circuitry. The modulation unit modulates the identification-information of the electronic circuitry, and further transmits the modulated identification-information to the hub controller.

The second detection unit further includes a third Schmitt trigger, a flip-flop, a shift register, and a switch register. The third Schmitt trigger configured to generate a pulse signal associated with the command data received from the hub controller. The flip-flop to receive the pulse signal from the third Schmitt trigger for generating a digital value associated with the command data. The shift register configured to shift the digital value into a digital code indicating the command data and further transmits the digital code to the interpreter.

The interpreter outputs the identification-information by executing the digital code received from the shift register. The switch register to receive the identification-information from the interpreter, and further transmits the identification-information to the modulation unit.

The hub controller comprising a decoding-sub circuit to decode the modulated identification-information received from the modulation unit. The hub controller outputs the first object information based on the decoded information.

The electronic circuitry further comprising one or more analog processing units connected to a first external device, further the analog processing unit decodes the first object information received from the hub controller to release an analog sound wave to the first external device.

The electronic circuitry further comprising one or more optical units to release an output signal, wherein the switch register switches the optical unit upon receiving identification-information from the interpreter.

The serial peripheral interface (SPI) connected to the switch register performs at least one of: switching the second external device upon receiving a switch-command data from the hub controller through the switch register, charging the second external device using the stored DC energy upon receiving a charge-command data from the hub controller through the switch register, reading a second object information from the second external device upon receiving a read-command data from the hub controller through the switch register, and further writing data from the interpreter to the second external device upon receiving a write-command data from the hub controller through the switch register. The hub controller receives the second object information from the second external device through the modulation unit, and further transmits the second object information to the communication device.

The hub section further comprising a wireless transceiver to communicate the first object information and the second object information from the hub controller to the communication device.

BRIEF DESCRIPTION OF THE DRAWINGS

The disclosure will provide details in the following description of preferred embodiments with reference to the following figures wherein.

DETAILED DESCRIPTION OF THE INVENTION

While this technology is illustrated and described in a preferred embodiment, a system for communicating user interaction data to one or more communication devices may be produced in many different configurations, forms and materials. There is depicted in the drawings, and will herein be described in detail, as a preferred embodiment of the invention, with the understanding that the present disclosure is to be considered as an exemplification of the principles of the invention and the associated functional specifications for its construction and is not intended to limit the invention to the embodiment illustrated. Those skilled in the art will envision many other possible variations within the scope of the technology described herein.

Figure 1:
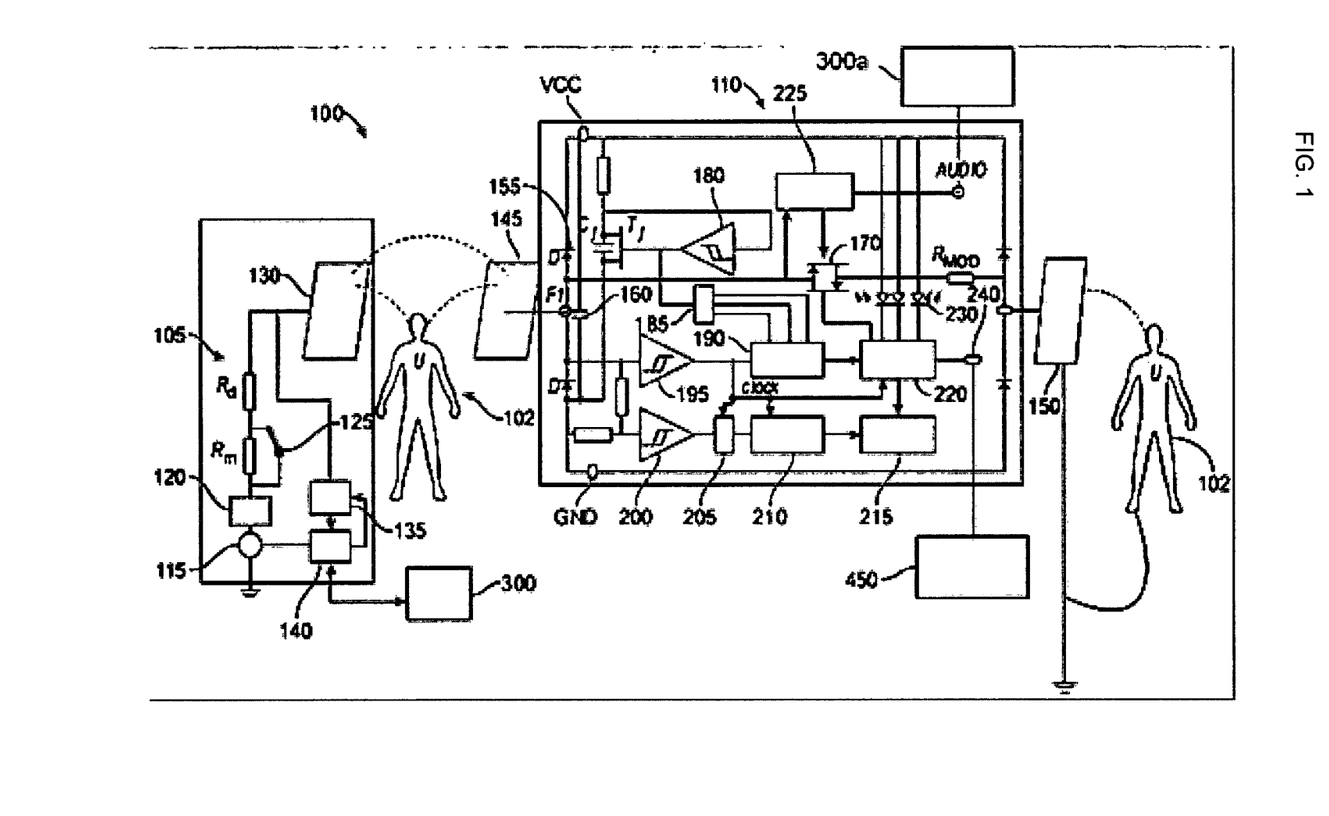
FIG. 1 illustrates a network architecture of a system attached to an object for communicating the object information to one or more communication devices, in accordance with a preferred embodiment of the present invention.

FIG. 1 illustrates network architecture of a system 100 attached to an object 102 for communicating the object information to one or more communication devices 300. The system 100 includes an electronic circuitry 110 to communicate the identification-information, and a hub section 105 coupled to the communication device 300 to power the electronic circuitry 110 and further receives the identification-information transmitted from the electronic circuitry 110. Examples of object 102 includes but not limited to a user, clothes, spectacles, shoes, watch, headphone, microphone, canes, wallets, food product, pen and any other items. Communication in between the object 102 and the electronic circuitry 110 is explained in detail in conjunction with FIG. 5A to FIG. 5E and FIG. 6A to FIG. 6D of the present invention.

Used herein the electronic circuitry 110 may be printed as a printed-electronic (PE) on paper, foils or other material like plastic polymers. The printed electronic (PE) may be operated as a hybrid-circuit in combination with conductive traces/surfaces/liquids/human skin. The electronic circuitry 110 may also be embedded in a single chip or in a printed decal or on a flexible polymer foil. The hub section 105 includes a generator 115, a first converter 120, a first switching unit 125, a first electrode 130, a first detection unit 135, and a hub controller 140. The hub section 105 may be integrated with the communication devices 300 such as smart phone and smart watch. The hub section 105 may be operated in the energetic cloud formed by the communication devices 300. The hub section 105 may be emulated as VHDL implementation in the communication devices 300.

The generator 115 receives DC power from a DC source of the communication device 300 for generating low level AC power. The first converter 120 shifts the low level AC power received from the generator 115 to high level AC power. Examples of the generator 115 include but not limited to an oscillator, a thermoelectric generator, and electromagnetic coils. Example of the first converter 120 may be a rectifier, inductor, resonator, cascade, diode bridges, transformer, and level shifter.

The first electrode 130 is connected to the first converter 120 for emitting an alternating electric field of fixed frequency. Example of the first electrode 130 includes but not limited to a conductive surface or a conductive thread. The first switching unit 125 is operative to transfer the AC power generated from the generator 115 to the first electrode 130.

The first switching unit 125 is connected to a resistance Rm and a resistance Rd to provide a high output impedance to cease the current flow from the generator 115 to the first electrode 130 when the first switching unit 125 is open. The current flow from the generator 115 to the first electrode 130 is bypassed from the resistance Rm when the first switching unit 125 is closed. The current flow then modulates the electric field with data (e.g. commands).

The first detection unit 135 detects a change in alternating electric-field across the first electrode 130. The hub controller 140 sends a command data to the electronic circuitry 110 based on the detected information for transmitting the first object information to the electronic circuitry 110. The hub controller 140 may be a finite state machine which may be implemented as hardware or software running on a processing unit or combinations of the two. Examples of the processing unit are micro-controller, silicon-on-chip, and Field programmable gate array.

The electronic circuitry 110 includes a second electrode 145, a floating electrode 150, a second converter 155, a buffer 160, a second detection unit, a modulation unit 170, and an analog processing unit 225. The second electrode 145 receives the alternating electric field emitted from the first electrode 130. The floating electrode 150 floats the alternating electric field to the ground for forming a closed electric circuit with at least one of the object 102 and the hub section 105. Examples of the second electrode 145 and the floating electrode 150 include but not limited to any conductive surface.

The second converter 155 connected to the second electrode 145 to convert the received alternating electric field into the DC energy. Example of the second converter 155 may be a rectifier, inductor, resonator, cascade, diode bridges, transformer, and level shifter. The buffer 160 configured to store the DC energy received from the second converter 155. Examples of the buffer 160 include but not limited to capacitor, silicon battery, goldcap or accumulator.

The second detection unit operative to measure or sense the variation in the alternating electric field over the second electrode 145, and further releases the identification-information for communicating with the hub controller 140. Further releases a time slot information for transmitting the sensed information from the electronic circuitry to the hub controller 140.

The modulation unit 170 operative to modulate the identification-information received from the second detection unit with the alternating electric field. The modulated identification-information transmitted by the modulation unit 170 may be modulated using any modulation technique. Examples of the modulation technique includes but are not limited to analog modulation such as AM, FM, PM, QAM, SM, digital modulation such as ASK, APSK, CPM, FSK, MFSK, MSK, OOK, PPM, PSK, QAM, SC-FDE, TCM or spread spectrum such as CSS, DSSS, FHSS, THSS.

The modulation unit 170 transmits the modulated identification-information to the hub controller 140. The hub controller 140 authenticates the electronic circuitry 110 on receiving the modulated identification-information. Further the hub controller 140 releases the first object information to the electronic circuitry 110 and the communication devices 300.

The second detection unit includes a first Schmitt trigger 180, a selector 185, a counter 190, a second Schmitt trigger 195 and an interpreter 215. The first Schmitt trigger 180 configured to generate a pulse interval signal related to the variation in the alternating electric field across the second electrode 145. The second Schmitt trigger 195 configured to generate a clock signal on receiving AC charges from the second electrode 145. The counter 190 configured to receive the pulse interval signal and the clock signal for generating a counter-value of the alternating electric field.

The selector 185 provides three selection-input to the counter 190. The selector 185 provides a first selection-input to Clear/open the counter 190 to count the pulses received from the second Schmitt trigger 195, after receiving the first pulse from the first Schmitt trigger 180. The selector 185 provides a second selection-input to stop the counting and latch the count result, after receiving the second pulse from the first Schmitt trigger 180.

The selector 185 provides a third selection-input to compare the previous-count-value and the present-count-value, after receiving the second pulse from the first Schmitt trigger 180.

The interpreter 215 interprets the counter-value into electric-field level percentage value indicating the identification-information of the electronic circuitry 110. The modulation unit 170 modulates the identification-information of the electronic circuitry 110 with the alternating electric field, and further transmits the modulated identification-information to the hub controller 140.

The second detection unit further includes a third Schmitt trigger 200, a flip-flop 205, a shift register 210, and a switch register 220. The third Schmitt trigger 200 is configured to generate a pulse signal associated with the command data received from the hub controller 140. The flip-flop 205 receives the pulse signal from the third Schmitt trigger 200 for generating a digital value associated with the command data.

The shift register 210 is configured to shift the digital value into a digital code indicating the command data and further transmits the digital code to the interpreter 215. The interpreter 215 outputs the identification-information by executing the digital code received from the shift register 210. The switch register 220 receives the identification-information from the interpreter 215, and further transmits the identification-information to the modulation unit 170 or switches sub circuits.

The hub controller 140 includes a decoding-sub circuit to decode the modulated identification-information received from the modulation unit 170. The hub controller 140 outputs the first object information based on the decoded information. The analog processing unit 225 is connected to a first external device 300a. Further the analog processing unit 225 decodes the first object information received from the hub controller 140 to release an analog signal, e.g. sound wave to the first external device 400.

The electronic circuitry 110 includes one or more optical unit 230 (e.g. LEDs) to release an output signal. The optical unit 230 is connected to the switch register 220 for switching the optical unit 230 upon receiving identification-information from the interpreter 215.

The electronic circuitry 110 includes a serial peripheral interface (SPI) 240 connected to the switch register 220. Firstly the serial peripheral interface 240 switches the second external device 450 e.g. music player upon receiving a switch-command data from the hub controller 140 through the switch register 220. Secondly the serial peripheral interface 240 allows charging of the second external device 450 using the stored DC energy upon receiving a charge-command data from the hub controller 140 through the switch register 220.

The second external device 450 also may be directly connected to VCC and GND of the electronic circuitry 110. A rechargeable battery may be connected to VCC and GND to provide extra power, when needed. The battery may be recharged, monitored or switched from the electronic circuitry 110 through the hub controller 140.

Thirdly, the serial peripheral interface 240 allows reading of a second object information by the interpreter 215 from the second external device 450. Examples of second external device 450 includes but not limited to smart microphone and sensors. The smart microphone detects speech of other users and sensors detect conditions of the products in a retail shop. The detection of speech and sensed information is second object information read from the second external device 450 upon receiving read command from the hub controller 140 through the switch register 220. The serial peripheral interface 240 allows writing the data from the interpreter 215 to the second external device 450 upon receiving a write-command data from the hub controller 140 through the switch register 220.

The hub controller 140 receives the second object information from the second external device 450 through the modulation unit 170. Further the hub controller 140 transmits the second object information to the communication device 300. The hub section 105 further includes a wireless transceiver (not shown in FIG. 1) to communicate the first object information and the second object information from the hub controller 140 to the communication device 300.

Figure 2A:
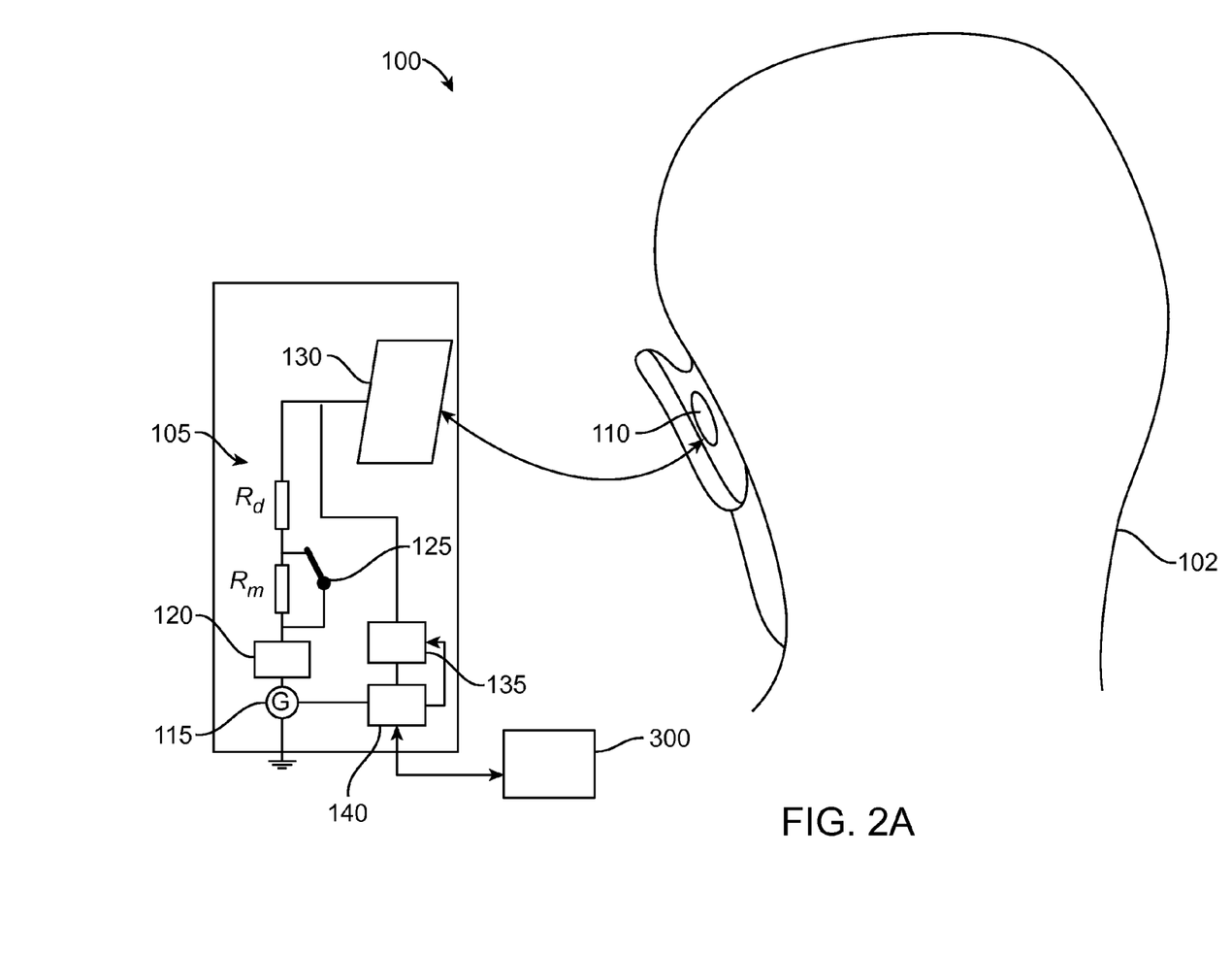
FIG. 2A illustrates the architectural diagram of communication in between the electronic circuitry implanted on user with a smart-microphone.
Figure 2B:
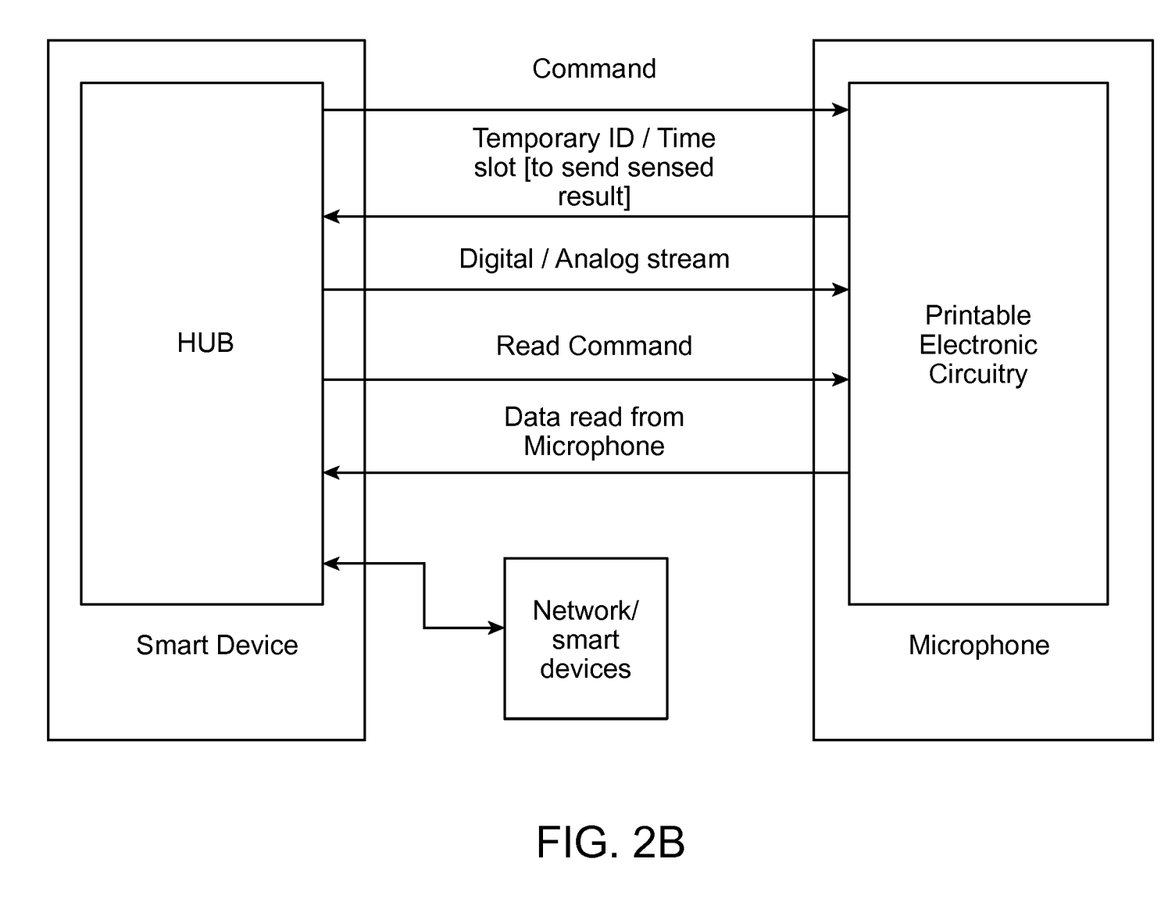
FIG. 2B illustrates a process flow diagram of communication of information related to object in between the electronic circuitry and the hub section.

FIG. 2A and FIG. 2B illustrate the architectural diagram of communication in between the electronic circuitry 110 implanted on user 102 with a communication device 300 such as smart-microphone, and a process flow diagram of communication of information related to an object in between the electronic circuitry 110 and the hub section 105, respectively. The first object-information is the digital stream of the analog signal e.g. audio signals associated with the therapeutic-data of different users 102 having auditory dysfunction of varied range (e.g. tinnitus). For exemplary purposes, the following are the varied range of auditory dysfunction of the users 102:

(1) Mild range:
  adults: between 26 and 40 dB; and
  children: between 20 and 40 dB
(2) Moderate range: between 41 and 54 dB
(3) Moderately severe: between 55 and 70 dB
(4) Severe: between 71 and 90 dB The electronic circuitry 110 e.g. printable electronic (PE) includes an interpreter to generate an identification-information. For an example, if the user-A 102 uses the audio-implant integrated with the printable electronic (PE) 110 then the identification-information indicates the ID of the user-A 102 suffering from auditory dysfunction of audio-range in between 41 and 54 dB.

The first electrode 130 of the hub section 105 provides an alternating electric field to the printable electronic (PE) 110. The printable electronic (PE) 110 harvests the alternating electric field into the DC energy. The first detection unit 135 of the hub section 105 detects the change in alternating electric-field across the first electrode 130. The change in alternating electric-field across the first electrode 130 is caused by the printable electronic (PE) 110 in reach of the hub section 105.

For an example, the first detection unit 135 detects the greater change in the alternating electric-field across the first electrode 130 is detected when the printable electronic (PE) 110 in reach of the hub section 105. The first detection unit 135 detects the lower change in the alternating electric-field across the first electrode 130 is detected when the printable electronic (PE) 110 in reach of the hub section 105.

The hub controller 140 generates a command-data to authenticate the printable electronic (PE) 110 when the greater change in the alternating electric-field across the first electrode 130 is detected. The third Schmitt trigger of the printable electronic (PE) 110 receives the command-data. Followed by the third Schmitt trigger, the command-data is processed by flip flop, shift register to provide the digital code indicating the command-data.

The interpreter of the printable electronic (PE) 110 interprets the digital code into the command data to generate the identification information e.g. user-id. The modulation unit of the printable electronic (PE) 110 modulates the user-id received through the switch register. Further the modulation unit sends the modulated user-id to the hub controller 140.

The hub controller 140 decodes the modulated user-id transmitted from the modulation unit. The hub controller 140 provides the audio signals associated with the therapeutic-data to the audio unit of the printable electronic (PE) 110 based on the user-id. For an example, if the hub controller 140 identifies the decoded user-id as user-A 102, then the hub controller 140 provides audio signals associated with the therapeutic-data to the user-A 102 suffering from auditory dysfunction of audio-range in between 41 and 54 dB.

The analog processing unit e.g. audio unit of the printable electronic (PE) 110 receives the first object information which is the digital stream of the analog signal e.g. audio signals transmitted from the hub-controller 140. The audio unit converts the digital stream of the audio signals into analog sound signal. Further the audio unit provides the audio signals to the first external device 300a e.g. stimulator.

The stimulator provides the electric impulse equivalent to the received analog sound signal, so that the user-A 102 having the hearing deficiency is treated using the electric impulse.

In the exemplary embodiment of the present invention, the printable electronics 110 includes the serial peripheral interface connectable to the second external device e.g. media player. For an example, when the read-command data is received from the hub section through the switch register, serial peripheral interface receives the second object information e.g. digital form of external analog signal e.g. external audio signals from the second external device.

Further the modulation unit modulates the received digital form of external audio signals, and transmits the modulated external audio signals to the hub controller 140. The hub controller 140 further transmits the received external audio signals to the network devices and the smart devices.

Figure 3:
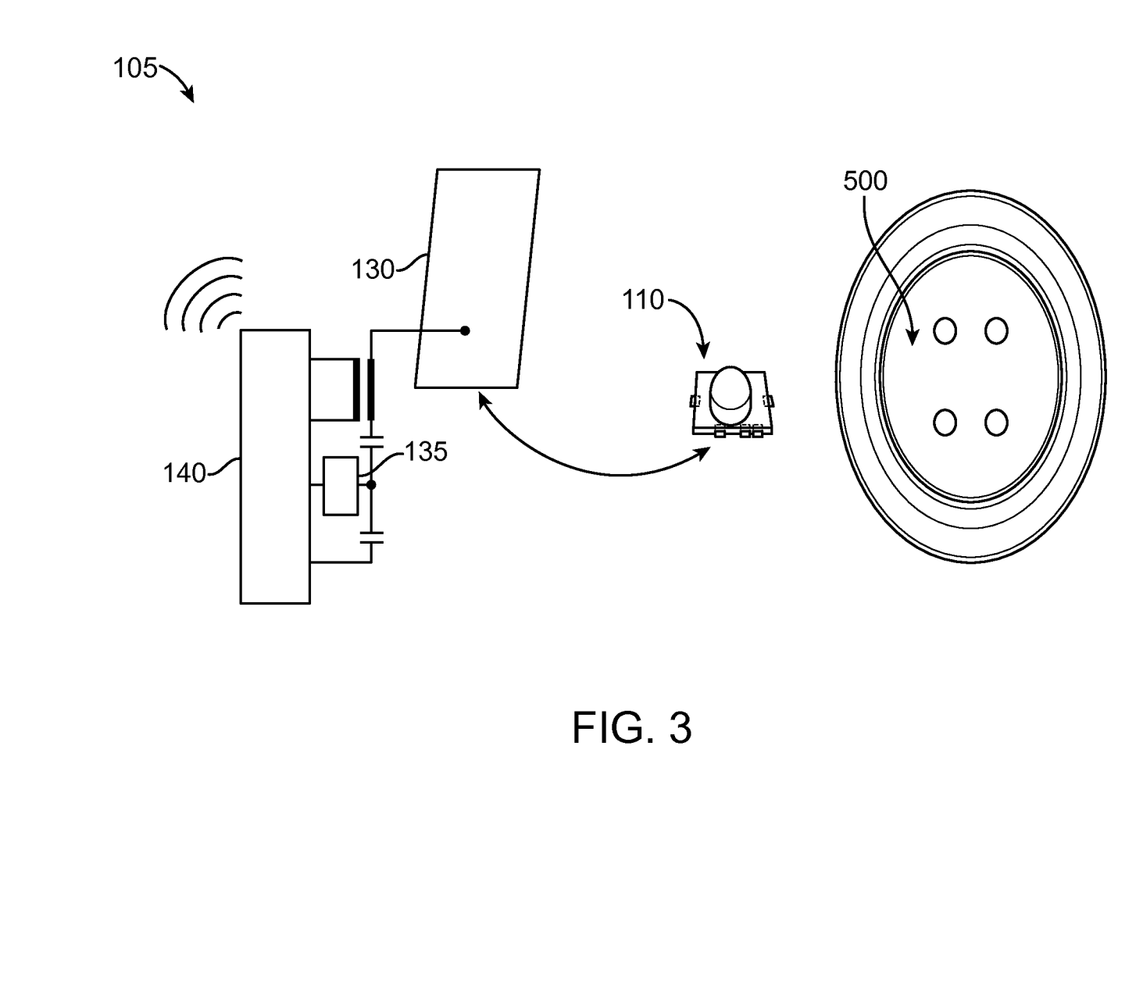
FIG. 3 illustrates the illumination of the LED-housed in the electronic circuitry integrated to a wearable article, in accordance with a preferred embodiment of the present invention.

FIG. 3 illustrates the illumination of the LED-housed with the electronic circuitry 110 integrated to a wearable article e.g. smart button 500 upon receiving the gesture of the user, in accordance to a first embodiment of the present invention. The electronic circuitry 110 is housed in a light source e.g. RGB LED. Examples of the light source include but not limited to a LED, OLED, and UV LED.

The first electrode 130 of the hub section 105 provides an alternating electric field to the printable electronic (PE) 110. The printable electronic (PE) 110 harvests the alternating electric field into the DC energy. The first Schmitt trigger of the printable electronic (PE) 110 monitors the input voltage of the capacitor $C_f$ connected to the buffer. The first Schmitt trigger triggers the transistor Tf to ON position so that the capacitor is discharged if the input voltage is above certain threshold.

The buffer (not shown in FIG. 2A) receives and stores the DC energy from the capacitor Cf. The buffer provides the stored DC energy to the RGB LED to illuminate a red-light element to indicate that the hub section 105 is in reach of the printable electronic 110.

The first detection unit 135 of the hub section 105 detects the change in alternating electric-field across the first electrode 130, when the printable electronic (PE) 110 in reach of the hub section 105. The hub controller 140 generates a command-data to authenticate the communication with the printable electronic (PE) 110 when the greater change in the alternating electric-field across the first electrode 130 is detected.

The third Schmitt trigger of the printable electronic (PE) 110 receives the command-data. Followed by the third Schmitt trigger, the command-data is processed by flip flop, shift register to provide the digital code indicating the command-data. The interpreter of the printable electronic (PE) 110 generates an identification-information based on the command data.

For an exemplary purpose, if an object e.g. shirt-on-sale stitched with the smart button 500 integrated with the printable electronic (PE) 110 then the identification-information indicates the ID of the shirt-on-sale.

The first Schmitt trigger of the printable electronic (PE) 110 configured to generate a pulse interval signal related to the variation in the alternating electric field across the second electrode or the floating electrode by the user gesture in proximity. For an example, the variation in the alternating electric field across the second electrode is caused by hand movement of the user approaching his/her hand towards the smart button 500 stitched with the shirt-on-sale.

The counter connected to the first Schmitt trigger outputs low-count-value indicating the greater change in the alternating electric-field across the first electrode is detected when the user gesture is in proximity to the shirt-on-sale.

The interpreter interprets the low-count-value into the interpret-data indicating the user gesture is in proximity to the shirt-on-sale.

The switch register receives the interpret-data from the interpreter, and further switches the RGB LED to illuminate a green-light element. The modulation unit modulates the interpret-data received from the interpreter through the switch register. The hub controller 140 receives the modulated interpret-data from the modulation unit, and in response the hub controller 140 sends a read-command data to printable electronic (PE) 110 in the smart button 500 of the shirt-on-sale. The read-command enables the read operation of the object information includes but not limited to cost-of-shirt, brand-of-shirt, type-of-shirt.

The printable electronics (PE) 110 includes the serial peripheral interface connectable to the second external device e.g. memory chip storing the object information. For an example, when the read-command data is received from the hub controller 140 through the switch register, serial peripheral interface receives the digital form of object information includes but not limited to cost-of-shirt, brand-of-shirt, type-of-shirt.

Further the modulation unit modulates the received digital form of object information, and transmits the modulated object information to the hub controller 140. The hub controller 140 further transmits the received object information to the network devices and the smart devices e.g. display device to display the object information includes but not limited to cost-of-shirt, brand-of-shirt, type-of-shirt. In a preferred embodiment, the electronic circuitry 110 is a silicon die with attached RGB LED, further may be called as "IoT-Dot". This offers the opportunity to provide generic sensing features for the 'Internet of Things' (IoT) in numerous applications. Those skilled in the art will envision many other possible variations within the scope of the technology described herein.

Figure 4A:
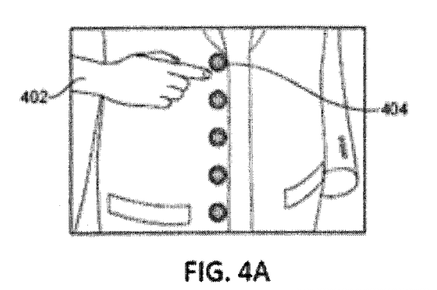
FIG. 4A illustrates the illumination of one or more LED-housed electronic circuitry integrated to the wearable articles e.g. first smart button upon receiving the gesture of the user, in accordance with a preferred embodiment of the present invention.
Figure 4B:
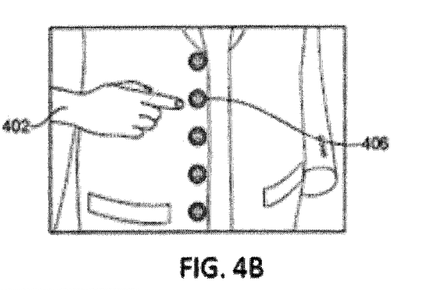
FIG. 4B illustrates the illumination of one or more LED-housed electronic circuitry integrated to the wearable articles e.g. second smart button upon receiving the gesture of the user, in accordance with a preferred embodiment of the present invention.
Figure 4C:
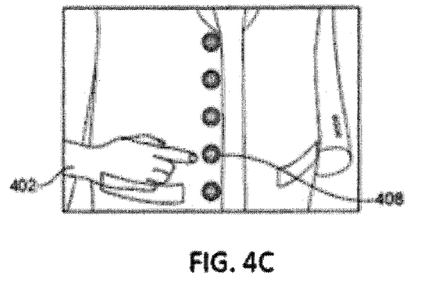
FIG. 4C illustrates the illumination of one or more LED-housed electronic circuitry integrated to the wearable articles e.g. last smart button upon receiving the gesture of the user, in accordance with a preferred embodiment of the present invention.

FIGS. 4A, 4B, and 4C illustrates the illumination of one or more LED-housed electronic circuitry integrated to the wearable articles e.g. buttons upon receiving change in the electric field caused by the changes near the wearable article the by the gesture of the user, in accordance to a first embodiment of the present invention. The LED-housed electronic circuitry illuminates the red light when the command-data indicates that the LED-housed electronic circuitry influenced only by the alternating electric field generated by the hub section. The changes in electric field may be occurred due to the presence of user, chemical or physical objects.

The first LED-housed electronic circuitry 404 switches from the red light to the green light to notify the detection of the user gesture 402. Further, the second LED-housed electronic circuitry 406 illuminates the green light upon detection of the user gesture 402. Preferably the LED-housed electronic circuitry is the RGB light. The first LED-housed electronic circuitry 404 and the second LED-housed electronic circuitry 406 remains glows the green light till the buttons receives the user gesture. As shown in FIG. 4C, when the user gesture 402 reaches at the fourth button, the fourth LED-housed electronic circuitry 408 glows the green light.

Figure 5A:
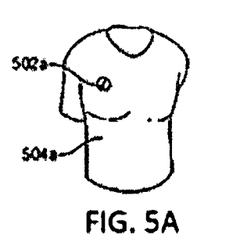
FIG. 5A illustrates the electronic circuitry integrated to the clothing, in accordance with a preferred embodiment of the present invention.

FIG. 5A illustrates the electronic circuitry 502a integrated to the clothing 504a, in accordance with a preferred embodiment of the present invention. The integrated electronic circuitry 502a may generate warning signal if wrong clothes are mixed together in a washing machine or warn in inappropriate combinations. Further the electronic circuitry 502a generates the audio signal on receiving the user gesture in regard to the status of the clothing 504a.

Figure 5B:
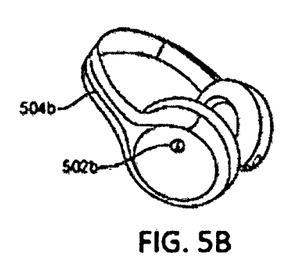
FIG. 5B illustrates the electronic circuitry integrated to the headphone, in accordance with a preferred embodiment of the present invention.

FIG. 5B illustrates the electronic circuitry 502b integrated to the headphone 504b, in accordance with a preferred embodiment of the present invention. The electronic circuitry 502b performs various operations such as media play, media pause, or media change based on the head gestures of the user.

Figure 5C:
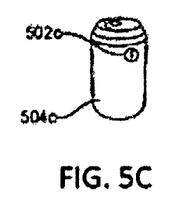
FIG. 5C illustrates the electronic circuitry integrated to the beverage container, in accordance with a preferred embodiment of the present invention.

FIG. 5C illustrates the electronic circuitry 502c integrated to the beverage container 504c, in accordance with a preferred embodiment of the present invention. The electronic circuitry 502c senses the condition of the beverage stored in the beverage container 504c for transmitting the sensed condition to the hub section or an external device.

Figure 5D:
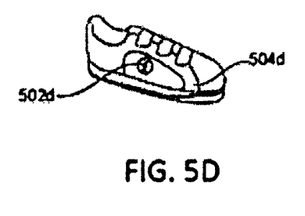
FIG. 5D illustrates the electronic circuitry integrated to the shoe, in accordance with a preferred embodiment of the present invention.

FIG. 5D illustrates the electronic circuitry 502d integrated to the shoe 504d, in accordance with a preferred embodiment of the present invention. The electronic circuitry 502d stores the information related to the shoe 504d. On sensing the user gesture the electronic circuitry 502d displays the stored information such as brand, price, size, washing conditions etc. on the external devices. Examples of the external devices includes but not limited to LCDs, PDAs etc.

Figure 5E:
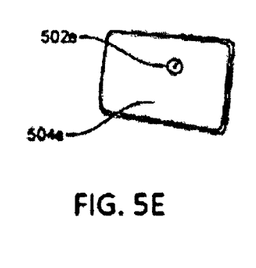
FIG. 5E illustrates the electronic circuitry integrated to the handbag, in accordance with a preferred embodiment of the present invention.

FIG. 5E illustrates the electronic circuitry 502e integrated to the handbag 504e, in accordance with a preferred embodiment of the present invention. The electronic circuitry 502e senses the user gesture towards the handbag 504e. On receiving the user gesture, the electronic circuitry 502e transmits the information related to the handbag 504e such as brand, price, size, color etc. to the user. After purchasing, the user may use the sensing features of the electronic circuitry 502e for tracking, gaming, augmented reality or other monitoring purposes.

Figure 6A:
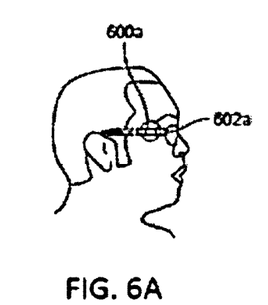
FIG. 6A illustrates the electronic circuitry integrated to the spectacle, in accordance with a preferred embodiment of the present invention.

FIG. 6A illustrates the electronic circuitry 600a integrated to the spectacle 602a, in accordance with a preferred embodiment of the present invention. The electronic circuitry 600a stores the information related to the spectacle 602a such as spectacle power, brand, price, color etc. and transmits to the external devices. After purchasing, the user may use the sensing features of the electronic circuitry 600a for tracking, gaming, augmented reality or other monitoring purposes.

Figure 6B:
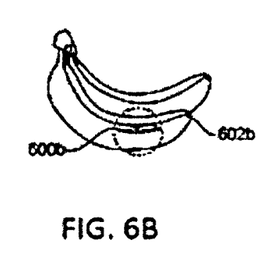
FIG. 6B illustrates the electronic circuitry integrated to the edible, in accordance with a preferred embodiment of the present invention.

FIG. 6B illustrates the electronic circuitry 600b integrated to the edible product 602b, in accordance with a preferred embodiment of the present invention. The electronic circuitry senses the edible product 602b conditions, pricing etc. and transmits the sensed information to the external devices on sensing the user gestures. After purchasing, the user may use the sensing features of the electronic circuitry 600b for tracking, gaming, augmented reality or other monitoring purposes.

Figure 6C:
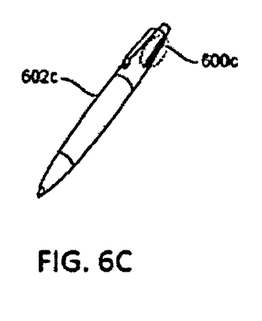
FIG. 6C illustrates the electronic circuitry integrated to the writing instrument, in accordance with a preferred embodiment of the present invention.

FIG. 6C illustrates the electronic circuitry 600c integrated to the writing instrument 602c, in accordance with a preferred embodiment of the present invention. The electronic circuitry 600c stores the information related to the writing instrument 602c such as color of the writing instrument, ink color, price, brand etc and further transmits the information to the external devices on sensing the user gesture.

Figure 6D:
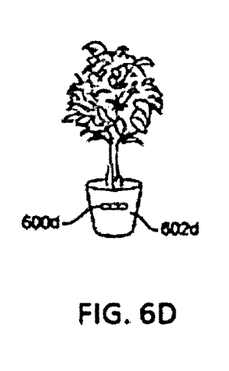
FIG. 6D illustrates the electronic circuitry integrated to the plant pot, in accordance with a preferred embodiment of the present invention.

FIG. 6D illustrates the electronic circuitry 600d integrated to the plant pot 602d, in accordance with a preferred embodiment of the present invention. The electronic circuitry 600d stores the status of the plant such as watering duration, plant conditions, and soil conditions changes in the plant's dielectric conditions (e.g. dry soil) etc. and further transmits the information to the external devices on sensing the user gesture.

Applications of the present invention include but not limited to markets, retail, electronic shelf labels, sensing shopping carts, customer identification, electronic packaging, smart product labels, SmartLogos, sales support, smart shelf, automotive, smart buttons, smart rubber, stop texting & driving, smart wheel, gesture control, signalling, smart devices, smart cradles, gesture cradles, gesture housing, signalling, audio or analog signal processing, smart microphones, smart ear-buds, audio implants, personal IoT-Hub (PIoTH), textile, smart buttons, smart shoes, smart gloves, headbands, fashion, watches, jewelry, glasses, textile effects, consumer electronics, appliance, white goods, like: fridge, washing machine, brown goods like: cooking stove, cook ware, music devices, gesture controlled devices, remote controls, gesture, signalling, identifying connected home, smart metering, smart signalling, smart furniture, presence monitoring, child protection, smart alert/protection, smart carpets, smart packaging, smart logos, sales support, Touch, gesture, pinch, signalizing RGB, audio, physical forces, Hub section is integrated in smart devices, modular phones, phone blocks, smart phones, integrated add-on, clip-ons, at shelf, at home, power outlet, smart TV, remote control, or keys. The electronic circuitry may also be attached to medical devices or tools for usage monitoring.

In retail applications, the electronic circuitry i.e. printable electronics hereinafter is described as IoT-Dots. IoT-Dots are object such as electronic smart-labels which consists of displays. The smart-labels may have dynamic prices to every recognizable consumer and may also warn the consumer for example with Red blinking if the product is not good to consume (e.g. presence of allergic ingredients). The smart-labels may also blink in other colors to make the product more attractive.

The IoT-Dots may be implemented into shopping carts to monitor the shopping behavior and check the items in the shopping carts (if they are taken from a shelf with Smart Labels or have IoT-Dots of themselves). The shopping carts may have the IoT-Dots as a sticker with an electronic display to give similar or additional information like the shelf labels.

Consumers may wear IoT-Dots in wearable articles from a consumer card, wristband, glasses, gloves, shoes or other wearable items or accessories. As the IoT-Dots have a unique ID registered in the hub section, so the consumer may be identified if the consumer comes in the reach of another HUB section. Further the IoT-Dots integrated into packaging and blisters of the products placed on the shop-shelf, to make the packaging more attractive or recognizable. The IoT-Dots further enables monitoring of the product placed in the fridge or drawers at home. IoT-Dots replace or enhance the Try-me' button in toys and the IoT-Dots enables implementation of Try-me' feature to any other product to realize the object-information on display screen or other multimedia devices.

In another exemplary embodiment of the present invention the IoT-Dots may be embedded into a rubber of the car tires. The IoT-Dots functions as a sensor to detect the air pressure, friction, impacts, and vibrations of the car tire. Further anti-pinch on the car tire, anti-theft of the car may be detected using the IoT-Dots. The IoT-Dots sends the detected data with the unique ID associated with the car through the hub section to the smart devices of the user. The hub section may be realized in form a car's electronic board, MCU, SOC or FPGA.

In another exemplary embodiment of the present invention the driver seat may be influenced by electric field provided from the hub section. The driver influenced by the electric field may operate the device e.g. music player equipped in the car. If the device contains an IoT-Dots, the IoT-Dots may operate and send signals associated with the device back to the hub section over the human body. Further the communication device e.g. mobile phone of the driver may controlled by the hub section, example the SMS function of the driver's mobile phone may be disabled by the hub section to insure safe-driving.

Further as the IoT-Dots includes switch register to control the switching modes: the IoT-Dots may switch off the driver's mobile phone and prevent the driver from using the mobile phone at the time of driving. If the driver hands the phone to a passenger, the IoT-Dots are away from the electric field provided by the hub section. The passenger may use the phone as the reason the IoT-Dots switches the phone to ON position upon detection of the variation in the electric field.

Further, the steering wheels may be equipped with various IoT-Dots. The steering wheels may give signals and find out if the driver handles the steering wheel correct or is driving with in inappropriate way by using his knees or if a passenger is properly holding the steering wheel. If the user selects navigator for getting assistance at the time of driving, then the visual indica associated with the navigation signals may be projected on the windscreen using the projector equipped with the IoT-DoTs.

The IoT-DoTs may also be used for providing optical signals which are reflected on a glass of the car, the wind screen or the side windows or other similar surface of the car. In a special variant the IoT-Dots may operate DLP, MEMs mirrors to display graphics or text. The optical signals may also displayed on the surface of the human skin e.g. user's arm. As the features of vehicles are complex and autonomous, the assistance in driving may be enhanced with gesture control features accomplished using the IoT-Dots embedded on every location of the car. The IoT-Dots measure the position and the dynamics of hands, limbs, heads and other similar user gestures, and invokes the driving assistance functionality in the car.

IoT-Dots may be integrated with the seat or in the headrest to distinguish whether the minor-user or adult-user is sitting in the car. The IoT-Dots or if their head moves towards mirrors or down for texting purposes. IoT-Dots may be arranged to measure 3D gestures. Additionally, IoT-Dots may give signals to the drivers on every point in the car because of the reverse faraday cage construction of the car. The electric field may be strong enough to operate the LEDs to show situations.

For existing smart devices the invention provides smart cradles. Smart cradles are plastic covers where smart devices may be embedded. The smart cradles contain IoT-Dots and/or hub section to allow the 3D gesture operation and other similar sensing features associated with a smart device. Once a smart device is placed on a smart cradles, the IoT-Dots may run application of the smart device upon detection of alterations in the electric field from the IOT dots incorporated in the smart cradle. Further the IoT-Dots detect other IoT-Dots in reach which are incorporated in other devices: toys, action figures, pawns, food, or textiles. The electric field spreads out over the human body when such a smart cradle is carried in a reach of one foot to the body and may operate all IoT-Dots in reach.

Special variant of smart cradles are gesture cradles which allow addition of 3D gestures functions to smart device which may be slided in or pressed in or attached to the gesture cradles. IoT-Dots may be arranged in the object/item to determine whether an adult-user or a minor-user is approaching towards the object/item.

If the adult-user is closer to the floating electrode of the IoT-Dots embedded in the object, the adult-user bridges the greater electric field to the IoT-Dots and therefore more electric field strength measurements is made by the IoT-Dots. If the minor-user is closer to the floating electrode of the IoT-Dots embedded in the object, the minor-user bridges the lesser electric field to the IoT-Dots and therefore less electric field strength measurements is made by the IoT-Dots. The aforementioned is a simple way to signalize the presence of people in a danger situation with respect to the hot-object, for example, hot iron.

In accordance to the present invention the hub section may also be printed as a printed-electronic (PE) on paper, foils or other material like plastic polymers. The printed electronic (PE) may be operated as a hybrid-circuit in combination with conductive traces/surfaces/liquids/human skin. The electronic circuitry 110 may also be embedded in a single chip or in a printed decal or on a flexible polymer foil. However, the hub section and printable electronic circuitry may be of any size and dimension without deviating from the scope of present invention.

Figure 7:
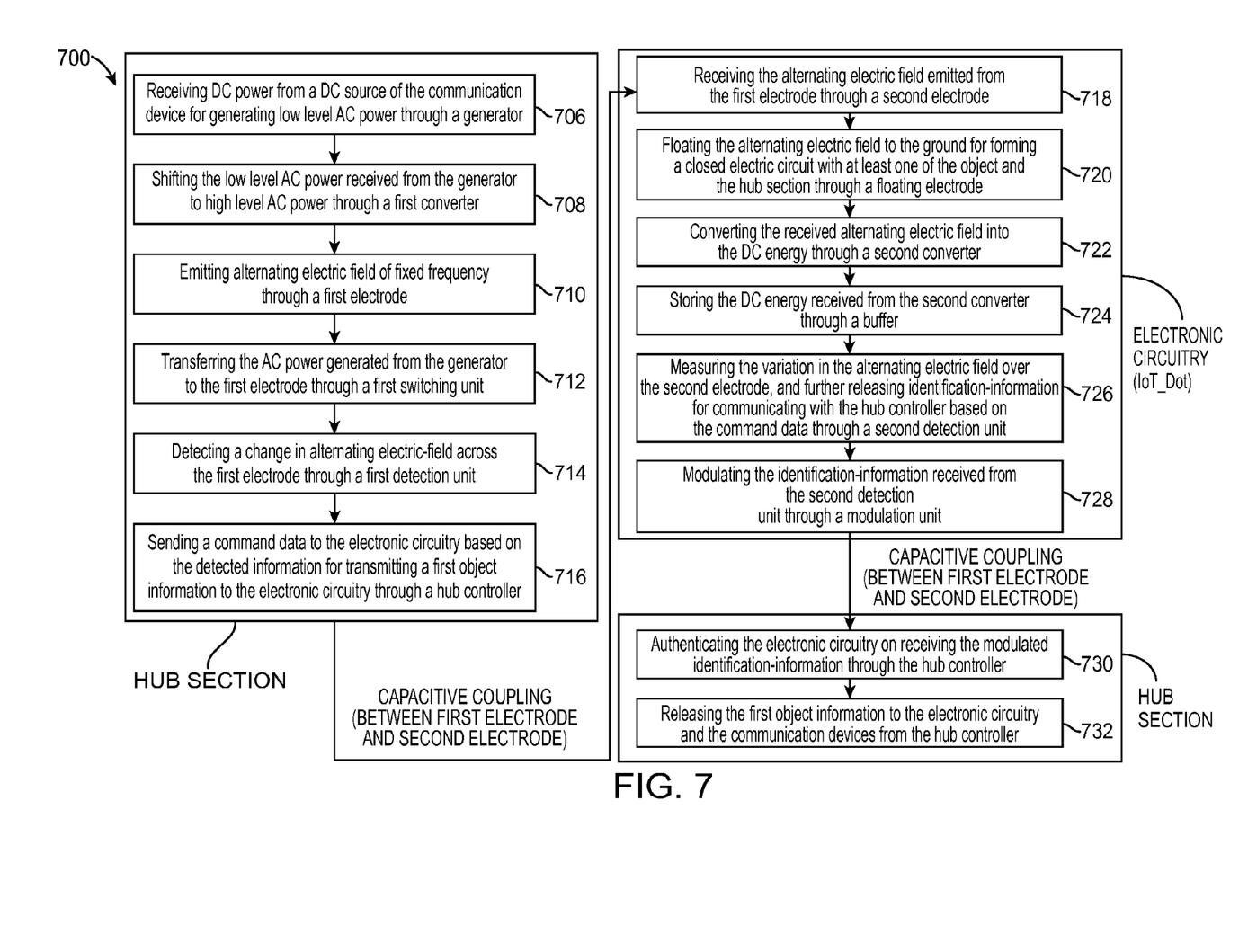
FIG. 7 illustrates the flow diagram of the method for communicating an object information to one or more communication devices.

FIG. 7 illustrates the flow diagram of the method 700 for communicating an object information to one or more communication devices. The method 700 initiates with the hub section starting operation over the capacitive coupled electronic circuitry. The step 706 includes receiving DC power from a DC source of the communication device for generating low level AC power through a generator.

The step 706 is followed by a step 708 of shifting the low level AC power received from the generator to high level AC power through a first converter. The step 708 is followed by a step 710 of emitting alternating electric field of fixed frequency through a first electrode.

The step 710 is followed by a step 712 of transferring the AC power generated from the generator to the first electrode through a first switching unit. The step 712 is followed by a step 714 of detecting a change in alternating electric-field across the first electrode through a first detection unit. The step 714 is followed by a step 716 of sending a command data to the electronic circuitry based on the detected information for transmitting the first object information from the electronic circuitry through a hub controller. The step 706 to step 716 performed by the hub section are explained in conjunction with FIG. 1.

The step 716 is followed by a step 718 of receiving the alternating electric field emitted from the first electrode through a second electrode attached to the electronic circuitry. The step 718 is followed by a step 720 of floating the alternating electric field to the ground for forming a closed electric circuit with at least one of the object and the hub section through a floating electrode.

The step 720 is followed by a step 722 of converting the received alternating electric field into the DC energy through a second converter. The step 722 is followed by a step 724 of storing the DC energy received from the second converter through a buffer. The step 724 is followed by a step 726 of measuring the variation in the alternating electric field over the second electrode, and further releasing identification-information for communicating with the hub controller based on the command data through a second detection unit.

The step 726 is followed by a step 728 of modulating the identification-information received from the second detection unit through a modulation unit. The step 718 to step 728 performed by the printable electronic i.e. IoT-Dot is explained in conjunction with FIG. 1.

The step 728 is followed by a step 730 of authenticating the electronic circuitry on receiving the modulated identification-information through the hub controller. The step 730 is followed by a step 732 of releasing the first object information to the electronic circuitry and the communication devices from the hub controller. The step 728 to step 732 performed by the hub section are explained in conjunction with FIG. 1.

The major advantages of the system is that the printable electronics requires no additional external parts, performs contactless sensing, powers peripherals, RF-free wireless communication, incorporated as printable electronic, flat & flexible foils, no soldering, no toxic chemicals. Important Advantages of the IoT-Dots: Beside the facts that the printable electronic i.e. IoT-Dots need no battery to operate, there are other advantages which are listed here:

IoT-Dots just need the electrodes to operate under the influence of the electric field. The IoT-Dot is a chip which is estimated 1×1 milimeter. In contactless sensing: the IoT-Dot needs no-contact to sense the condition of the object. The reason is the object works in the electric field either as a conductive surface which absorbs or bridges the electric field. Further the object works in the electric field as a dielectric which changes the impedance of the electronic circuitry i.e. IoT-Dot.

IoT-Dots powers the peripheral devices. The IoT-Dots have an output, VCC and the GND to power external devices or buffers, IoT-Dots also may charge batteries. IoT-Dots may also control the peripherals, and send/receive data to/from the peripherals.

IoT-Dots requires RF-free wireless communication. The IoT-Dots work in the modulated alternating electric fields, bidirectional and may communicate with a hub or with other IoT-Dots over the built-in possible infrared channel.

IoT-Dots are flat and flexible, small and so tinny, they may be attached to flexible devices or clothes or textiles without being broken or bended. Especially if the foils are extremely thin, the IoT-Dots may used as microphones as the IoT-Dots react on vibration of the air.

IoT-Dots require no soldering. IoT-Dots are prepared to be glued on the conductive electrodes, there is no need for printed circuit boards, soldering processes or other assembling techniques, and IoT-Dots may embedded into foils or connects with electrodes just by friction.

IoT-Dots need no toxic chemicals. Normal wearable and IoT devices and sensors are meant to be equipped with batteries which are made of toxic materials like lithium, sulfur, or acid which are harmful; are hard to recycle and the burden for the environment. IoT-Dots don't have batteries.

There has thus been shown and described the system attached to an object for communicating the object information to one or more communication devices. Many changes, modifications, variations and other uses and applications of the subject invention will, however, become apparent to those skilled in the art after considering this specification and the accompanying drawings which disclose the preferred embodiments thereof. All such changes, modifications, variations and other uses and applications which do not depart from the spirit and scope of the invention are deemed to be covered by the invention, which is to be limited only by the claims which follow.

The invention claimed is:

1. A system attached to an object for communicating the object information to one or more communication devices, the system comprising: an electronic circuitry to communicate an identification-information; and a hub section coupled to the one or more communication devices to power the electronic circuitry and further receives the identification-information transmitted from the electronic circuitry; wherein the hub section comprising: a generator to receive DC power from a DC source of the communication device for generating low level AC power; a first converter to shift the low level AC power received from the generator to high level AC power; a first electrode connected to the first converter for emitting alternating electric field of fixed frequency; a first switching unit operative to transfer the low level AC power generated from the generator to the first electrode; a first detection unit to detect a change in alternating electric-field across the first electrode; and a hub controller to send a command data to the electronic circuitry based on the detected information for transmitting a first object information to the electronic circuitry, wherein the electronic circuitry comprising: a second electrode to receive the alternating electric field emitted from the first electrode; a floating electrode to float the alternating electric field to the ground for forming a closed electric circuit with at least one of the object and the hub section; a second converter connected to the second electrode to convert the received alternating electric field into the low level DC energy; a buffer configured to store the low level DC energy received from the second converter; a second detection unit operative to measure the variation in the alternating electric field over the second electrode, and further releases identification-information for communicating with the hub controller based on the command data; a modulation unit operative to modulate the alternating electric field with the identification-information received from the second detection unit; and wherein the hub controller authenticates the electronic circuitry on receiving the modulated identification-information, further the hub controller communicates the first object information to the electronic circuitry and the communication devices based on the modulated identification-information;

wherein the second detection unit comprising: a first Schmitt trigger configured to generate a pulse interval signal related to the variation in the alternating electric field across the second electrode; a second Schmitt trigger configured to generate a clock signal on receiving AC power from the second electrode; a counter configured to receive the pulse interval signal and the clock signal for generating a counter-value of the alternating electric field; and an interpreter interprets the counter-value into electric-field percentage value indicating the identification-information of the electronic circuitry, wherein the modulation unit modulates the identification-information of the electronic circuitry, and further transmits the modulated identification-information to the hub controller.

2. The system according to claim 1, wherein the second detection unit further comprising: a third Schmitt trigger configured to generate a pulse signal associated with the command data received from the hub controller; a flip-flop to receive the pulse signal from the third Schmitt trigger for generating a digital value associated with the command data; a shift register configured to shift the digital value into a digital code indicating the command data and further transmits the digital code to the interpreter, wherein the interpreter outputs the identification-information by executing the digital code received from the shift register; and a switch register to receive the identification-information from the interpreter, and further transmits the identification-information to the modulation unit.

3. The system according to the claim 1, wherein the hub controller comprising a decoding-sub circuit to decode the modulated identification-information received from the modulation unit, wherein the hub controller outputs the first object information based on the decoded information.

4. The system according to the claim 1, wherein the electronic circuitry further comprising one or more analog processing unit connected to a first external device, further the one or more analog processing unit decodes the first object information received from the hub controller to release an analog signal to the first external device.

5. The system according to the claim 1, wherein the electronic circuitry further comprising one or more optical unit to release an output signal, wherein a switch register switches the one or more optical unit upon receiving identification-information from an interpreter.

6. The system according to the claim 1, comprising a serial peripheral interface (SPI) connected to a switch register to perform at least one of: switching an external device upon receiving a switch-command data from the hub controller through the switch register; charging the second external device using the stored DC energy upon receiving a charge-command data from the hub controller through the switch register; reading a second object information from the second external device upon receiving a read-command data from the hub controller through the switch register; and writing data from the interpreter to the second external device upon receiving a write-command data from the hub controller through the switch register, wherein the hub controller receives the second object information from the second external device through the modulation unit, and further transmits the second object information to the communication device.

7. The system according to the claim 6, wherein the hub section further comprising a wireless transceiver to communicate the first object information and the second object information from the hub controller to the communication device.

8. A method for communicating an object information to one or more communication devices, the method comprising the steps of:
receiving DC power from a DC source of the one or more communication devices for generating low level AC power through a generator; shifting the low level AC power received from the generator to high level AC power through a first converter; emitting alternating electric field of fixed frequency through a first electrode; transferring the low level AC power generated from the generator to the first electrode through a first switching unit; detecting a change in alternating electric-field across the first electrode through a first detection unit; sending a command data to the electronic circuitry based on the detected information for transmitting a first object information to the electronic circuitry through a hub controller; receiving the alternating electric field emitted from the first electrode through a second electrode; floating the alternating electric field to the ground for forming a closed electric circuit with at least one of the object and the hub through a floating electrode; converting the received alternating electric field into the DC energy through a second converter; storing the DC energy received from the second converter through a buffer; measuring the variation in the alternating electric field over the second electrode, and further releasing identification-information for communicating with the hub controller based on the command data through a second detection unit; modulating the identification-information received from the second detection unit through a modulation unit; authenticating the electronic circuitry on receiving the modulated identification-information through the hub controller; and releasing the first object information to the electronic circuitry and the communication devices from the hub controller; and further comprising the steps of: generating a pulse interval signal related to the variation in the alternating electric field across the second electrode through a first Schmitt trigger; generating a clock signal on receiving AC power from the second electrode through a second Schmitt trigger; receiving the pulse interval signal and the clock signal for generating a counter-value of the alternating electric field through a counter; interpreting the counter-value into electric-field percentage value indicating the identification-information of the electronic circuitry through an interpreter; and modulating the identification-information of the electronic circuitry, and further transmits the modulated identification-information to the hub controller through the modulation unit.

9. The method according to claim 8 further comprising the steps of: generating a pulse signal associated with the command data received from the hub controller through a third Schmitt trigger; receiving the pulse signal from the third Schmitt trigger for generating a digital value associated with the command data through a flip-flop; shifting the digital value into a digital code indicating the command data and further transmits the digital code to the interpreter though a shift register; and receiving the identification-information from the interpreter, and further transmits the identification-information to the modulation unit through a switch register.

10. The method according to the claim 8 further comprising the step of decoding the modulated identification-information received from the modulation unit through a decoding-sub circuit.

11. The method according to the claim 8 further comprising the step of decoding the first object information received from the hub controller to release an analog sound wave to an external device through an analog processing unit.

12. The method according to the claim 8 further comprising the steps of: releasing an output signal though one or more optical unit; and switching the optical unit upon receiving identification-information from the interpreter through the switch register.

13. The method according to the claim 8 further comprising the steps of: switching an external device upon receiving a switch-command data from the hub controller through the switch register; charging the external device using the stored DC energy upon receiving a charge-command data from the hub controller through the switch register; and reading a second object information from the external device upon receiving a read-command data from the hub controller through the switch register; receiving the second object information from the external device through the modulation unit, and further transmitting the second object information to the communication device; and writing data from the interpreter to the second external device upon receiving a write-command data from the hub controller through the switch register.

14. The method according to the claim 13 further comprising the step of communicating the first object information and the second object information from the hub controller to the communication device through a wireless transceiver.

* * * * *